US011320785B2

(12) United States Patent
Zhang et al.

(10) Patent No.: US 11,320,785 B2
(45) Date of Patent: May 3, 2022

(54) HOLOGRAPHIC OPTICAL ELEMENT AND MANUFACTURING METHOD THEREOF, IMAGE RECONSTRUCTION METHOD AND AUGMENTED REALITY GLASSES

(71) Applicants: BEIJING BOE DISPLAY TECHNOLOGY CO., LTD., Beijing (CN); BOE TECHNOLOGY GROUP CO., LTD., Beijing (CN)

(72) Inventors: Hongshu Zhang, Beijing (CN); Hebin Zhao, Beijing (CN); Yun Qiu, Beijing (CN); Dan Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 348 days.

(21) Appl. No.: 16/615,215

(22) PCT Filed: May 24, 2019

(86) PCT No.: PCT/CN2019/088404
§ 371 (c)(1),
(2) Date: Nov. 20, 2019

(87) PCT Pub. No.: WO2019/228280
PCT Pub. Date: Dec. 5, 2019

(65) Prior Publication Data
US 2021/0356910 A1    Nov. 18, 2021

(30) Foreign Application Priority Data

May 31, 2018   (CN) .......................... 201810549783.7

(51) Int. Cl.
*G03H 1/26*     (2006.01)
*G02B 5/32*     (2006.01)
(Continued)

(52) U.S. Cl.
CPC .............. *G03H 1/265* (2013.01); *G02B 5/32* (2013.01); *G02B 27/0172* (2013.01);
(Continued)

(58) Field of Classification Search
None
See application file for complete search history.

(56) References Cited

U.S. PATENT DOCUMENTS

| 2004/0179251 A1* | 9/2004 | Anderson | G11B 7/00772 |
| | | | 359/3 |
| 2006/0077853 A1* | 4/2006 | Matsumoto | G11B 7/083 |
| | | | 369/103 |

(Continued)

OTHER PUBLICATIONS

Extended European Search Report issued by the European Patent Office for the corresponding European Patent Application No. 19810947.2, dated Jan. 28, 2022. 8 pages.

(Continued)

*Primary Examiner* — Jennifer D. Carruth
(74) *Attorney, Agent, or Firm* — Leason Ellis LLP (57) ABSTRACT

A holographic optical element and a manufacturing method thereof, an image reconstruction method, and augmented reality glasses are disclosed. The holographic optical element includes a substrate, and a recording material layer in which at least two groups of interference fringes are recorded; each group includes a first interference fringe formed by a first signal light and a first reference light respectively incident from opposite sides of the recording material layer, and a second interference fringe formed by a second signal light and a second reference light respectively incident from opposite sides of the recording material layer; the second signal light passes through a lens before incidence; incident angles of the first signal light and the second reference light are equal; incident directions of the first (Continued)

signal light corresponding to respective groups are different, and focal lengths of the lenses are not equal.

19 Claims, 5 Drawing Sheets

(51) Int. Cl.
 *G02B 27/01* (2006.01)
 *G11B 7/0065* (2006.01)
(52) U.S. Cl.
 CPC .... *G11B 7/0065* (2013.01); *G02B 2027/0174* (2013.01); *G02B 2027/0178* (2013.01); *G03H 2223/19* (2013.01); *G03H 2225/60* (2013.01); *G03H 2270/55* (2013.01)

(56) References Cited

U.S. PATENT DOCUMENTS

| | | | | |
|---|---|---|---|---|
| 2009/0279406 A1* | 11/2009 | Ogasawara | .......... | G11B 7/0065 369/103 |
| 2010/0142014 A1* | 6/2010 | Rosen | .................. | G03H 1/0402 359/1 |
| 2018/0129165 A1 | 5/2018 | Lee et al. | | |

OTHER PUBLICATIONS

Nam Kim et al., "Holographic Optical Elements and Application", Holographic Materials and Optical Systems, Mar. 22, 2017, InTech, pp. 99-131. 35 pages.

\* cited by examiner

HOLOGRAPHIC OPTICAL ELEMENT AND MANUFACTURING METHOD THEREOF, IMAGE RECONSTRUCTION METHOD AND AUGMENTED REALITY GLASSES

CROSS-REFERENCE TO RELATED PATENT APPLICATIONS

This application is a U.S. National Stage Application under 35 U.S.C. § 371 of International Patent Application No. PCT/CN2019/088404, filed May 24, 2019, which claims priority to Chinese patent application No. 201810549783.7, filed on May 31, 2018, both of which are incorporated herein by reference in their entireties as part of the present application.

TECHNICAL FIELD

Embodiments of the present disclosure relate to a holographic optical element and a manufacturing method thereof, an image reconstruction method, and augmented reality glasses.

BACKGROUND

A holographic optical element (HOE) is an optical element manufactured according to the principle of holography, and is usually manufactured on a photosensitive film material. The holographic optical element is a diffractive optical element based on the principle of diffraction. The holography refers to technology of recording the amplitude and phase distribution of light waves on a photographic film or a dry sheet and reproducing a three-dimensional image of an object. The ordinary photography can only record the amplitude (intensity) of light reflected or transmitted by an object, so it records a two-dimensional image of the object. The holography can not only record the amplitude of light, but also can record the phase of light. The light wave reflected by the illuminated object propagates with carrying information of the object shape, the wave-front of the light wave carrying the information is recorded by a recording medium, and the wave-front can be reproduced at another time and place by an appropriate method, so that the three-dimensional image of the object can be observed.

The depth of field refers to a distance measured between the nearest and farthest objects, which are in acceptably sharp focus in an image, in front of a camera lens or other imagers. With the development of the holographic optical element and the increasing demand for the depth of field of the image by a client, more and more attention has been paid to the research of the holographic optical element with multiple depths of field in the display field.

SUMMARY

At least an embodiment of the present disclosure provides a holographic optical element, and the holographic optical element includes a substrate and a recording material layer disposed on the substrate; at least two groups of interference fringes are recorded in the recording material layer, and each group of the interference fringes includes a first interference fringe and a second interference fringe; the first interference fringe is formed by a first signal light incident from one side of the recording material layer and a first reference light incident from the other side of the recording material layer; the second interference fringe is formed by a second signal light incident from one side of the recording material layer and a second reference light incident from the other side of the recording material layer, and the second signal light passes through a lens before incidence; an incident angle of the first signal light is equal to an incident angle of the second reference light; and incident directions of the first signal light corresponding to respective groups of the interference fringes are different, and focal lengths of the lenses, through which the second signal light corresponding to respective groups of the interference fringes passes before incidence, are not equal.

At least an embodiment of the present disclosure further provides a manufacturing method of a holographic optical element, which includes: forming a recording material layer on a substrate, and forming at least two groups of interference fringes in the recording material layer. And each group of the interference fringes includes a first interference fringe and a second interference fringe. Forming each group of the interference fringes includes: using a first signal light to illuminate the recording material from one side of the substrate and a first reference light to illuminate the recording material layer from the other side of the substrate, and recording the first interference fringe in the recording material layer; and providing a lens on one side of the substrate, using a second signal light to illuminate the recording material from one side of the substrate and a second reference light to illuminate the recording material layer from the other side of the substrate, and recording the second interference fringe in the recording material layer; and the second signal light and the lens are on the same side of the substrate. In forming each group of the interference fringes, an incident angle of the first signal light is equal to an incident angle of the second reference light; and in forming different groups of the interference fringes, incident directions of the first signal light are different, and focal lengths of the lenses are different.

At least an embodiment of the present disclosure further provides an image reconstruction method for a holographic optical element, applicable to the holographic optical element described above. The image reconstruction method includes: using a detecting light to illuminate each group of the at least two groups of interference fringes of the holographic optical element, respectively, so as to construct images of at least two depths of field, and each group of the interference fringes includes a first interference fringe and a second interference fringe. Using the detecting light to illuminate each group of the interference fringes includes: providing a spatial light modulator on one side of the holographic optical element, where the spatial light modulator is on an extension line of an optical path of the first signal light forming the first interference fringe of the holographic optical element; using the detecting light to illuminate the first interference fringe along an incident direction of the first reference light to allow the detecting light to be diffracted to the spatial light modulator by the first interference fringe, wherein the detecting light and the spatial light modulator are on the same side of the holographic optical element; and using the spatial light modulator to modulate a diffracted light of the detecting light, allowing a modulated light to return to the holographic optical element along an incident direction of the second reference light forming the second interference fringe of the holographic optical element, and allowing the modulated light to be diffracted to an extension line of an optical path of the second signal light forming the second interference fringe by the second interference fringe. The detecting light is a coherent light of the first signal light, and the modulated light is a coherent light of the second signal light.

At least an embodiment of the present disclosure further provides augmented reality glasses, including a lens; and the lens is provided with the holographic optical element provided by the embodiments described above.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

It should be noted that, in the present disclosure, a "light" is not used to indicate a lamp but a light beam.

Some embodiments of the present disclosure provide a holographic optical element, and the holographic optical element includes a substrate and a recording material layer disposed on the substrate. At least two groups of interference fringes are recorded in the recording material layer, and each group of the interference fringes includes a first interference fringe and a second interference fringe. The first interference fringe is formed by a first signal light incident from one side of the recording material layer and a first reference light incident from the other side of the recording material layer; the second interference fringe is formed by a second signal light incident from one side of the recording material layer and a second reference light incident from the other side of the recording material layer, and the second signal light passes through a lens before incidence; an incident angle of the first signal light is equal to an incident angle of the second reference light; and incident directions of the first signal light corresponding to respective groups of the interference fringes are different, and focal lengths of the lenses, through which the second signal light corresponding to respective groups of the interference fringes passes before incidence, are not equal.

Each group of the interference fringes recorded in the holographic optical element described above can form an image of one depth of field, and the holographic optical element having a plurality of groups of interference fringes can form images of multiple depths of field.

Moreover, the process of forming the first interference fringe is equivalent to the process of manufacturing a reflector with a specific angle. By designing incident angles of the first signal light and the first reference light, a detecting light can be directionally diffracted to a specific direction by the first interference fringe, thereby allowing the holographic optical element to have a directional reflection function.

In addition, in the process of forming the second interference fringe, by utilizing the characteristics that the lens has a focus, the image is formed at a fixed position, and human eyes can observe the image only at a specific position related to the focal length, so that the holographic optical element can have a lens function.

In addition, the interference fringes corresponding to the signal light of different incident angles recorded in the holographic optical element described above can present images corresponding to the signal light of a plurality of angles, thereby implementing angle division multiplexing of the holographic optical element. The interference fringes corresponding to the signal light of different incident angles are stored in the same holographic optical element, so that the capacity of the holographic optical element for storing the wave-front information can be effectively increased, and the storage density can be improved.

In another aspect, the holographic optical element described above has the advantages of transparency, small volume and thin thickness, and can be applied to augmented reality glasses. In a case where the holographic optical element is applied to augmented reality glasses, the ambient light can enter human eyes through the holographic optical element and fuse with images of different depths of field, thereby providing a rich visual experience.

Figure 1A:
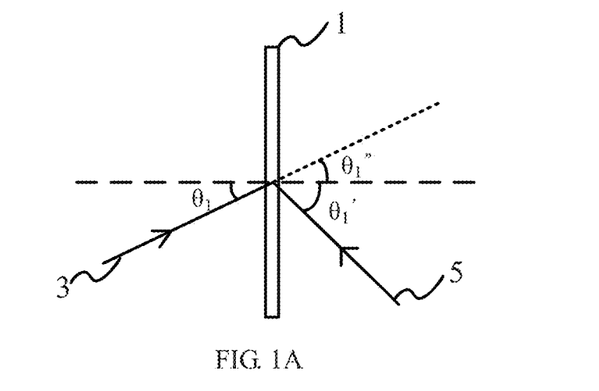
FIG. 1A is a schematic diagram of a method for manufacturing a first interference fringe in one group of interference fringes of a manufacturing method of a holographic optical element provided by at least an embodiment of the present disclosure.
Figure 1B:
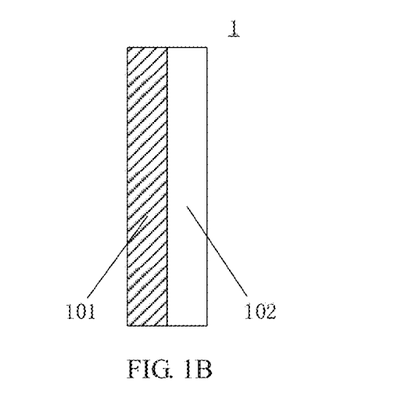
FIG. 1B is a schematic structural diagram of a holographic optical element provided by at least an embodiment of the present disclosure.

In at least one embodiment, with reference to FIG. 1A and FIG. 1B, the holographic optical element 1 is in the form of a sheet, and the holographic optical element 1 includes a substrate 101 and a recording material layer 102 disposed on the substrate 101. The substrate 101 is a transparent substrate or a transparent base film, for example, made of a glass or plastic material. At least two groups of interference fringes are recorded in the recording material layer 102, and each group of the interference fringes includes a first interference fringe and a second interference fringe.

Figure 2:
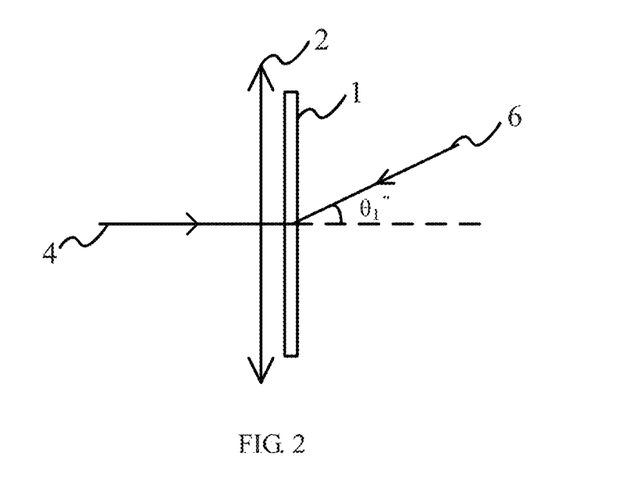
FIG. 2 is a schematic diagram of a method for manufacturing a second interference fringe in the one group of interference fringes illustrated in FIG. 1.

The first interference fringe is formed by a first signal light 3 incident from one side of the recording material layer and a first reference light 5 incident from the other side of the recording material layer. With reference to FIG. 2, the second interference fringe is formed by a second signal light 4 incident from one side of the recording material layer and a second reference light 6 incident from the other side of the recording material layer, and the second signal light 4 passes through a lens 2 before incidence. An incident angle θ1 of the first signal light 3 is equal to an incident angle θ1" of the second reference light 6.

It should be noted that incident directions of the first signal light 3 corresponding to respective groups of the interference fringes are different, and focal lengths of the lenses 2, through which the second signal light 4 corresponding to respective groups of the interference fringes passes before incidence, are not equal.

It should be noted that, in the present disclosure, an incident angle refers to the angle between the incident light and the normal line of the incident surface (as indicated by the dashed line perpendicular to the surface of the holographic optical element 1 in FIG. 1). Therefore, two beams of incident light with different incident directions may have the same incident angle. For example, when two beams of incident light are symmetrically incident from both sides of the normal line of the incident surface, incident angles of the two beams of incident light are equal.

It should also be noted that the first signal light 3, the first reference light 5, the second signal light 4, and the second reference light 6 are plane waves. The first reference light 5 is a coherent light of the first signal light 3. For example, the first reference light 5 and the first signal light 3 are both laser beams, and for example, the first reference light 5 and the first signal light 3 are laser beams obtained through splitting one laser beam from a same first light source (not shown) by a beam splitter. The second reference light 6 is a coherent light of the second signal light 4. For example, the second reference light 6 and the second signal light 4 are both laser beams, and for example, the second reference light 6 and the second signal light 4 are laser beams obtained through splitting one laser beam from a same second light source (not shown) by a beam splitter. The first light source is the same as or different from the second light source.

Illustratively, with reference to FIG. 1A, for the first group of interference fringes, the first signal light 3 is incident from the left side of the recording material layer of the holographic optical element 1 at an angle of $\theta_1$, the first reference light 5 is incident from the right side of the recording material layer of the holographic optical element 1 at an angle of $\theta_1'$, and the first signal light 3 and the first reference light 5 interfere in a plane (for example, in a central plane of the recording material layer according to design) in which the recording material layer is located, so that the first interference fringe is recorded in the recording material layer of the holographic optical element 1.

With reference to FIG. 2, the second signal light 4 is incident from the left side of the holographic optical element 1 and passes through the lens 2 having a focal length F1 before incidence, the second reference light 6 is incident from the right side of the holographic optical element 1 at an angle of $\theta_1''$, and the second signal light 4 and the second reference light 6 interfere in a plane (for example, in a central plane of the recording material layer according to design) in which the recording material layer is located, so that the second interference fringe is recorded in the recording material layer of the holographic optical element 1.

Therefore, the holographic optical element 1 having one group of interference fringes can be formed subsequent to the above two operations. In some other embodiments, for the second group of interference fringes, incident angles of the first signal light 3, the first reference light 5, and the second reference light 6 are changed, the focal length of the lens is changed, for example, by using a lens having a focal length different from F1, and the above steps are repeated to form a first interference fringe and a second interference fringe of the second group of interference fringes. And so on, by changing the angles of the light beams and the focal length of the lens, a plurality of groups of interference fringes can be formed in the same holographic optical element 1.

One holographic imaging technique implements imaging with multiple depths of field by programming computer algorithms or by zooming, for example, adjusting a voltage in a liquid crystal prism to implement zooming to form images of multiple depths of field. In various embodiments of the present disclosure, each group of interference fringes recorded in the holographic optical element 1 can form an image of one depth of field, and the holographic optical element 1 having a plurality of groups of interference fringes can form images of multiple depths of field. The imaging method is simple and easy to operate, and the cost is low.

Furthermore, in some embodiments of the present disclosure, the process of forming the first interference fringe is equivalent to the process of manufacturing a reflector with a specific angle. By designing the incident angles of the first signal light 3 and the first reference light 5, the detecting light can be directionally diffracted to a specific direction by the first interference fringe, thereby allowing the holographic optical element 1 to have a directional reflection function. In the process of forming the second interference fringe, by utilizing the characteristics that the lens 2 has a focus, the image is formed at a fixed position, and human eyes can observe the image only at a specific position related to the focal length, so that the holographic optical element 1 can have the lens function. Therefore, the embodiments of the present disclosure described above integrate functions of a plurality of optical elements in one holographic optical element 1, thereby improving the practicality.

In addition, the interference fringes corresponding to the signal light of different incident angles recorded in the holographic optical element 1 provided by any one of the embodiments of the present disclosure can present images corresponding to the signal light of a plurality of angles, thereby implementing angle division multiplexing of the holographic optical element 1. The interference fringes corresponding to the signal light of different incident angles are stored in the same holographic optical element 1, so that the capacity of the holographic optical element 1 for storing the wave-front information can be effectively increased, and the storage density can be improved.

Furthermore, the holographic optical element 1 provided by some embodiments of the present disclosure further has the advantages of transparency, small volume and thin thickness. Some embodiments of the present disclosure integrate functions of a plurality of optical elements in a film of holographic optical element 1, while the another holographic optical technique described above implements integrating functions of various optical element by an element (e.g., a liquid crystal prism) having a certain thickness. Compared with the another holographic optical technique, the holographic optical element 1 provided by some embodiments of the present disclosure has a thin thickness and high transparency, and can be applied to augmented reality glasses. In a case where the holographic optical element 1 is applied to augmented reality glasses, the ambient light can enter human eyes through the holographic optical element 1 and fuse with images of different depths of field, thereby providing a rich visual experience.

In some embodiments of the present disclosure, a forming material of the recording material layer includes at least one selected from the group consisting of a photosensitive resin, a silver halide, and a dichromate gelatin.

Some embodiments of the present disclosure further provide a manufacturing method of a holographic optical element, which can be used for manufacturing the holographic optical element 1 in the above embodiments. The manufacturing method of the holographic optical element 1 includes a step of forming the recording material layer on the substrate, and further includes a step of forming at least two groups of interference fringes in the recording material layer.

The step of forming each group of the at least two groups of interference fringes in the recording material layer includes: using a first signal light 3 to illuminate the recording material from one side of the substrate and a first reference light 5 to illuminate the recording material layer from the other side of the substrate, allowing the first signal light 3 and the first reference light 5 to interfere in the recording material layer, and recording the first interference fringe in the recording material layer; and providing a lens 2 on one side of the substrate, using a second signal light 4 to illuminate the recording material from one side of the substrate and a second reference light 6 to illuminate the recording material layer from the other side of the substrate, wherein the second signal light 4 and the lens 2 are on the same side of the substrate, allowing the second signal light 4 and the second reference light 6 to interfere in the recording material layer, and recording the second interference fringe in the recording material layer. In forming each group of the interference fringes, an incident angle of the first signal light 3 is equal to an incident angle of the second reference light 6; and in forming different groups of the interference fringes, incident directions of the first signal light 3 are different, and focal lengths of the lenses 2 are different.

It should be noted that, in the above manufacturing process, the first signal light 3, the first reference light 5, the second signal light 4, and the second reference light 6 are plane waves, the first reference light 5 is a coherent light of the first signal light 3, and the second reference light 6 is a coherent light of the second signal light 4.

In addition, the function of providing the lens 2 in the case of forming the second interference fringe is that by utilizing the focus function of the lens 2, the light through the holographic optical element 1 forms an image at a fixed position, and the observer can observe the image only at a specific position. By using the lenses 2 with different parameters, imaging positions of the holographic optical element 1 are different, thereby implementing the function of imaging with multiple depths of field. The types of lenses 2 used in the process of manufacturing a plurality of groups of interference fringes are the same, the focal lengths of the lenses 2 are different, and other specifications such as size may be the same or different.

The beneficial effects generated by using the above method to manufacture the holographic optical element 1 are the same as the beneficial effects of the holographic optical element 1 described in some embodiments of the present disclosure, and details are not described herein again.

In some embodiments of the present disclosure, the incident angle of the second signal light 4 is determined based on the position and viewing angle of eyes relative to the holographic optical element 1 upon the observer observing the image. For example, upon the observer observing the image, the eyes are facing the center of the holographic optical element 1, and the viewing angle is zero. In this case, the incident direction of the second signal light 4 is perpendicular to the substrate plane, so that the imaging position is in the direction where the observer observes. For another example, in a case where the observer's eyes are located at the above right side of the plane of the substrate of the holographic optical element 1, the second signal light 4 is incident from the lower left side of the plane of the substrate of the holographic optical element 1, so that the observer can successfully observe the image.

Hereinafter, the manufacturing method of the hologram optical element 1 will be described in detail by taking eyes facing the center of the hologram optical element 1 upon the observer observing the image as an example.

The operation of manufacturing the first group of interference fringes includes a step of manufacturing the first interference fringe. With reference to FIG. 1A, the first signal light 3 is incident from the left side of the recording material layer of the holographic optical element 1 at an angle of $\theta_1$, the first reference light 5 is simultaneously incident from the right side of the recording material layer of the holographic optical element 1 at an angle of $\theta_1'$, and the first interference fringe is recorded in the recording material layer of the holographic optical element 1.

The operation of manufacturing the first group of interference fringes further includes a step of manufacturing the second interference fringe. With reference to FIG. 2, the lens 2 having a focal length F1 is provided on the left side of the substrate of the holographic optical element 1, and the second signal light 4 is used to illuminate the recording material layer from the left side of the lens 2. Because the eyes are facing the center of the hologram optical element 1 upon the observer observing the image, the second signal light 4 is incident in the horizontal direction (the direction of the normal line of the holographic optical element 1) in FIG. 2. Simultaneously, the second reference light 6 is used to illuminate the recording material layer from the right side of the substrate at an angle of $\theta_1''$, so that the second interference fringe can be recorded in the recording material layer. Herein, the incident angle $\theta_1$ of the first signal light 3 and the incident angle $\theta_1''$ of the second reference light 6 are equal.

Figure 3:
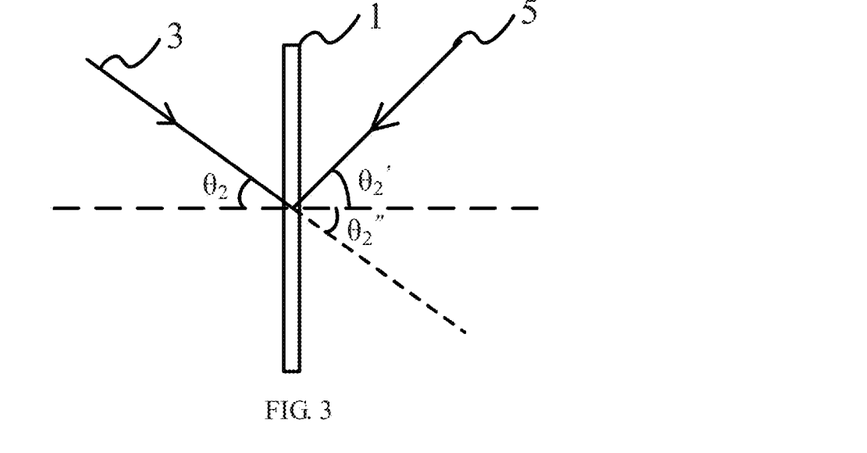
FIG. 3 is a schematic diagram of a method for manufacturing a first interference fringe in another group of interference fringes of a manufacturing method of a holographic optical element provided by at least an embodiment of the present disclosure.
Figure 4:
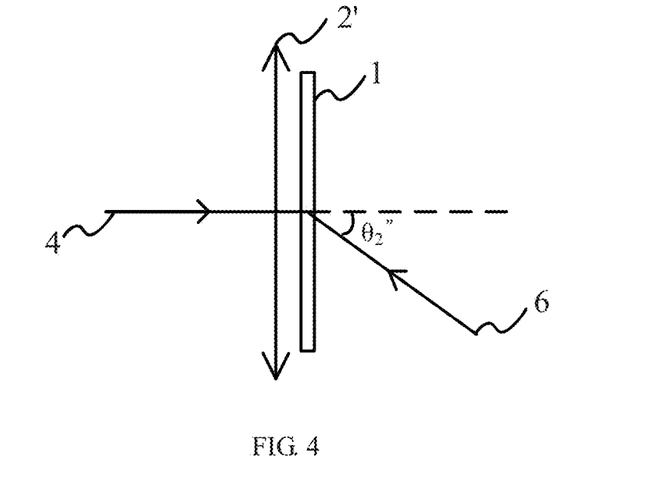
FIG. 4 is a schematic diagram of a method for manufacturing a second interference fringe in the another group of interference fringes illustrated in FIG. 3.

The operation of manufacturing the second group of interference fringes also includes manufacturing the first interference fringe. With reference to FIG. 3, the first signal light 3 is incident from the left side of the recording material layer of the holographic optical element 1 at an angle of $\theta_2$, the first reference light 5 is simultaneously incident from the right side of the recording material layer of the holographic optical element 1 at an angle of $\theta_2'$, and the first interference fringe of the second group of interference fringes is recorded in the recording material layer of the holographic optical element 1. For the step of manufacturing the second interference fringe, with reference to FIG. 4, the lens 2' having a focal length F2 (for example, different from the focal length F1) is provided on the left side of the substrate of the holographic optical element 1, the second signal light 4 is used to illuminate the recording material layer from the left side of the lens 2' in the horizontal direction, and the second reference light 6 is used to illuminate the recording material layer from the right side of the substrate at an angle of $\theta_2''$, so that the second interference fringe of the second group of interference fringes can be recorded in the recording material layer. Herein, the incident angle $\theta_2$ of the first signal light 3 is equal to the incident angle $\theta_2''$ of the second reference light 6.

In some embodiments of the present disclosure, in the process of manufacturing the first group and second group of interference fringes, the incident angles of the two first signal light 3 may use an asymmetric design, that is, $\theta_1 = \theta_1''$, $\theta_2 = \theta_2''$, and $\theta_1 \neq \theta_2$, or may also use a symmetric design, that is, $\theta_1 = \theta_1'' = \theta_2 = \theta_2''$, where the two first signal light 3 are incident at the same incident angle, but in different directions.

By using the above methods, changing the incident direction of the first signal light 3, and accordingly, changing the incident angles of the first reference light 5 and the second reference light 6, and using lenses having different focal lengths (i.e., different from the previous lens 2 and lens 2'), a plurality of groups of interference fringes (for example, three groups or four groups of interference fringes, or more groups of interference fringes) can be manufactured, so as to form images of multiple depths of field.

In some embodiments of the present disclosure, a difference between the incident angles of the second reference light 6 corresponding to different groups of interference fringes is greater than or equal to 0.5°. Because the different groups of interference fringes have an angle dependence, holographic diffraction at different angles does not affect each other, but the angles should not be too close. If the angles are too close, a slight diffraction occurs between the interference fringes, which is easy to form ghost shadow and affects imaging quality. In practical applications, in a case where a plurality of reference light emitters are required, the installation space between the emitters is limited. If the angles are too close, the emitters cannot be installed, and the imaging effect is affected.

In some embodiments of the present disclosure, the types of the lens 2 and the lens 2' described above include at least one of a convex lens, a concave lens, and a Fresnel lens, or any combination of at least two of them, that is, the lens 2 and the lens 2' can be combined lenses (lens group). In a case where the types of the lens 2 and the lens 2' used in the process of manufacturing the holographic optical element 1 are different, the types of images after image reconstruction are different, and the types of the lens 2 and the lens 2' can be determined according to practical imaging requirements.

For example, a convex lens is used to form real images of multiple depths of field, and the image observing position and the convex lens are at different sides of the holographic optical element 1. A plurality of groups of convex lenses having different focal lengths form images of multiple depths of field. The larger the focal length of the convex lens is, the farther the imaging position is away from the holographic optical element 1. For example, a concave lens is used to form virtual images of multiple depths of field, and the image observing position and the concave lens are at the same side of the holographic optical element 1. The enlarged virtual images are presented, and images in different groups have a difference in magnification. A Fresnel lens is equivalent to a convex lens 2 having multiple focus, and for example, the Fresnel lens is used to form a main image and a plurality of secondary images, and is used to form reduced real images of multiple depths of field.

In some embodiments of the present disclosure, the areas of the selected lens 2 and lens 2' are both equal to or greater than the area of the substrate, which facilitates recording interference fringes throughout the substrate and increasing the area of the viewing field of the holographic optical element 1.

In some embodiments of the present disclosure, the lens 2 and the lens 2' are disposed adjacent to the substrate, and the spacing between the substrate and the lens 2 or the lens 2' is 0 to 5 cm. If the distance between the substrate and the lens 2 or the lens 2' is too far, the image formed by the first interference fringe and the image formed by the second interference fringe are not in one plane, and a phase difference is likely to occur. Ideally, if the lens 2 and the lens 2' are integrated with the substrate of the element, the substrate can implement the functions of the lens 2 and the lens 2'. In practical operation, the lens 2 and the lens 2' can be disposed as close as possible to the substrate, which is not easy to generate a phase difference.

Some embodiments of the present disclosure further provide an image reconstruction method for a holographic optical element, applicable to the holographic optical element 1 manufactured by the method described above. The image reconstruction method includes steps of using a detecting light to illuminate at least two groups of interference fringes of the holographic optical element 1, respectively, so as to construct images of at least two depths of field, and each group of interference fringes includes a first interference fringe and a second interference fringe. Using the detecting light to illuminate each group of the interference fringes includes the following operations:

providing a spatial light modulator (SLM) on one side of the holographic optical element 1, where the spatial light modulator is on an extension line of an optical path of the first signal light 3 forming the first interference fringe of the holographic optical element 1; using the detecting light to illuminate the first interference fringe along the incident direction of the first reference light 5 to allow the detecting light to be diffracted to the spatial light modulator by the first interference fringe, where the detecting light and the spatial light modulator are on the same side of the holographic optical element 1; and using the spatial light modulator to modulate a diffracted light of the detecting light, allowing a modulated light to return to the holographic optical element 1 along the incident direction of the second reference light 6 forming the second interference fringe of the holographic optical element 1, and allowing the modulated light to be diffracted to an extension line of an optical path of the second signal light 4 forming the second interference fringe by the second interference fringe. Herein, the detecting light is a coherent light of the first signal light 3, and the modulated light is a coherent light of the second signal light 4.

The beneficial effects of using the above method to perform image reconstruction on the holographic optical element 1 are the same as the beneficial effects of the holographic optical element 1 described in some embodiments of the present disclosure, and details are not described herein again.

In the following, the image reconstruction method for the holographic optical element 1 manufactured according to the above embodiments will be described in detail by taking a case where the eyes of the observer face the center of the hologram optical element 1 and images of two depths of field are formed as an example.

Figure 5:
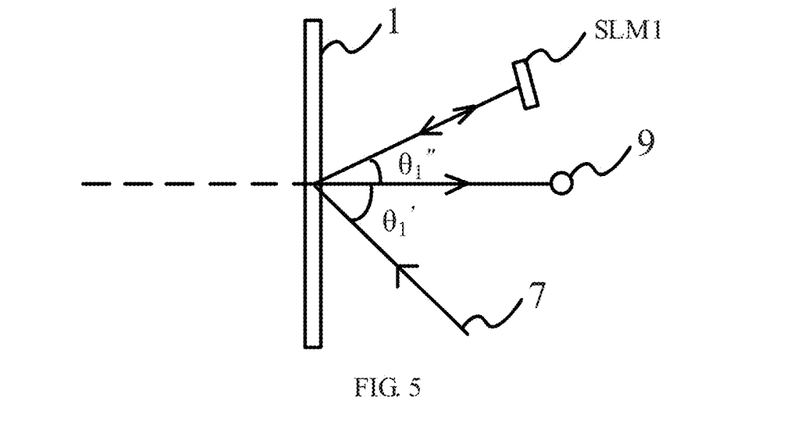
FIG. 5 is a schematic diagram of an image reconstruction method for the one group of interference fringes illustrated in FIG. 1A and FIG. 2.

With reference to FIG. 5, in a case where an image of a first depth of field is formed, the first group of interference fringes are used to form the image. A first spatial light modulator SLM1 is disposed on the right side of the holographic optical element 1, and the first spatial light modulator SLM1 is on an extension line of the optical path of the first signal light 3 forming the first interference fringe of the first group of interference fringes. On the right side of the holographic optical element 1, a first detecting light 7 is used to illuminate the first interference fringe along the incident direction of the first reference light 5, and the incident angle is $\theta_1'$, so that the first detecting light 7 is diffracted to the first spatial light modulator SLM1 by the first interference fringe. The first spatial light modulator SLM1 is used to modulate the diffracted light of the first detecting light 7, for example, to modulate the amplitude and/or phase of the light, or to modulate how much light each pixel reflects, that is, to adjust the grayscale of each pixel, thereby allowing an emitted light to present different images. A first modulated light can be obtained by modulating the diffracted light of the first detecting light 7, and the first modulated light returns to the holographic optical element 1 along the incident direction (opposite to the direction of the optical path of the diffracted light of the first detecting light 7) of the second reference light 6 forming the second interference fringe of the first group of interference fringes, that is, the incident angle of the first modulated light is $\theta_1''$, so that the first modulated light is diffracted to an extension line of the optical path of the second signal light 4 forming the second interference fringe by the second interference fringe (that is, the first modulated light emits along the horizontal direction after being diffracted). The eyes of the observer are in the direction facing the center of the holographic optical element 1, and the image, that is, a first image 9, of one depth of field can be observed.

Figure 6:
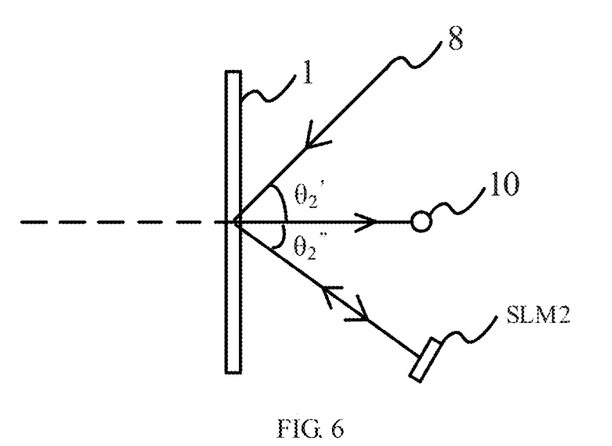
FIG. 6 is a schematic diagram of an image reconstruction method for the another group of interference fringes illustrated in FIG. 3 and FIG. 4.

With reference to FIG. 6, in a case where an image of a second depth of field is formed, the second group of interference fringes are used to form the image. A second spatial light modulator SLM2 is disposed on the right side of the holographic optical element 1, and the second spatial light modulator SLM2 is on an extension line of the optical path of the first signal light 3 forming the first interference fringe of the second group of interference fringes. On the right side of the holographic optical element 1, a second detecting light 8 is used to illuminate the first interference fringe along the incident direction of the first reference light 5, and the incident angle is $\theta_2'$, so that the second detecting light 8 is diffracted to the second spatial light modulator SLM2 by the first interference fringe. The second spatial light modulator SLM2 is used to modulate the diffracted light of the second detecting light 8, and the second modulated light returns to the holographic optical element 1 along the incident direction (opposite to the direction of the optical path of the diffracted light of the second detecting light 8) of the second reference light 6 forming the second interference fringe of the second group of interference fringes, that is, the incident angle of the second modulated light is $\theta_2''$, so that the second modulated light is diffracted to an extension line of the optical path of the second signal light 4 forming the second interference fringe by the second interference fringe (that is, the second modulated light emits along the horizontal direction after being diffracted). The eyes of the observer are in the direction facing the center of the holographic optical element 1, and the image, that is, a second image 10, of another depth of field can be observed.

Figure 7:
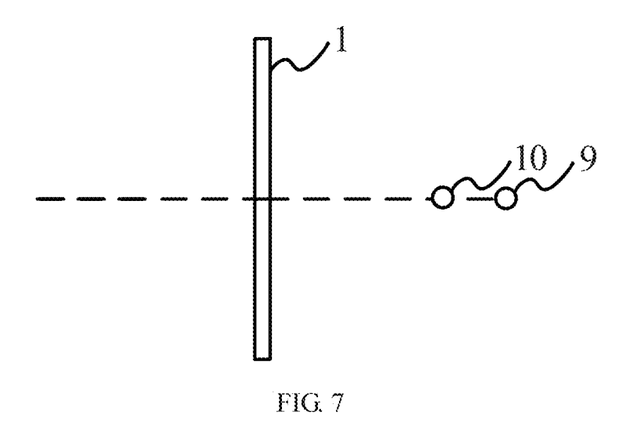
FIG. 7 is a schematic diagram of depths of field subsequent to image reconstruction in FIG. 5 and FIG. 6.

The imaging distances of the first image 9 and the second image 10 are related to the focal lengths of the lens 2 and the lens 2' used for manufacturing the holographic optical element 1. For example, in a case where the focal length F1 of the lens 2 used for manufacturing the holographic optical element 1 is greater than the focal length F2 of the lens 2' used for manufacturing the holographic optical element 1, that is, F1>F2, the distance between the imaging position of the first image 9 and the holographic optical element 1 is greater than the distance between the imaging position of the second image 10 and the holographic optical element 1 as illustrated in FIG. 7.

In some embodiments of the present disclosure, the spatial light modulator includes an amplitude-type spatial light modulator or a phase-type spatial light modulator. If the spatial light modulator uses the amplitude-type modulator, such as a digital micro-mirror device (DMD), an image of a fixed depth of field can be formed, such as the first image 9 and the second image 10 in FIG. 7. If the spatial light modulator uses the phase-type spatial light modulator (a spatial light modulator that can change the phase), such as a liquid crystal on silicon (LCOS) modulator, the change of the phase will affect the image, and the image being presented is a complicated and transformed image of a variable depth of field. The phase-type spatial light modulator can be used in a case where a dynamically adjustable image is desired to be presented.

In some embodiments of the present disclosure, the image reconstruction method for the holographic optical element further includes: using a plurality of spatial light modulators to repeat the above steps of image reconstruction to form a plurality of beams of modulated light. Different beams of modulated light modulate images of different depths of field, and intensities of the plurality of beams of modulated light satisfies a relationship of light intensity modulation of a squeezed light field, so as to form a light field augmented reality.

The light field refers to the amount of light that passes through each point in each direction. By using the light field technology, an object can be focused based on the distance. The ordinary augmented reality (AR) can only present a planar image or an image of a single depth of field through the lens, while the light field augmented reality technology can present images of at least two depths of field.

Subsequent to the fabrication and the image reconstruction of the holographic optical element according to the steps described above, an image of a fixed depth of field is presented as illustrated in FIG. 7. If the light field augmented reality is implemented, in a case where the modulated light field is observed by human eyes, the perceived depth of field is larger than the depth of field illustrated in FIG. 7. Compared to the depth of field in FIG. 7, the depth of field of the squeezed light field is a continuous range, not two fixed points, and the depth of field is wider. Therefore, in a case where the light field augmented reality is implemented, the observer can observe images of continuous depths of field, so that the depth of field is wider in visual perception, thereby improving the user experience.

Figure 8:
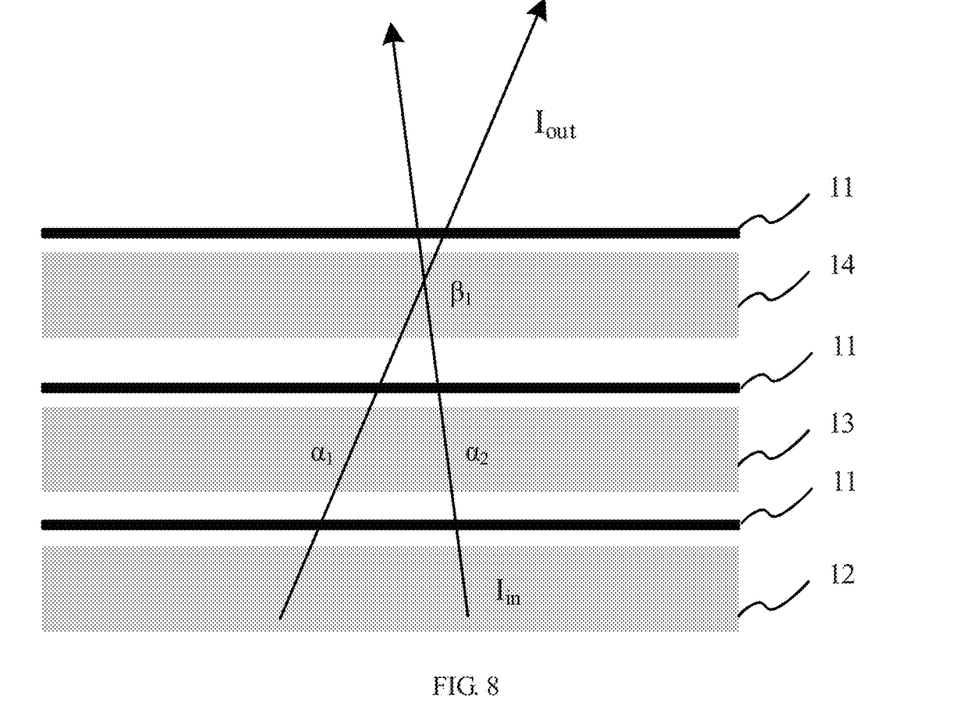
FIG. 8 is a schematic diagram of the principle of a squeezed light field.

The principle of the squeezed light field can be with reference to FIG. 8. As illustrated in FIG. 8, a light field system is generally provided with a backlight layer 12, a polarizing layer 11 and a plurality of liquid crystal screens. The liquid crystal screen is used as a spatial light modulation unit for multi-layer light field display, and can modulate the intensity of the incident light (from the backlight layer 12) through the grayscale values of corresponding pixels or even sub-pixels between layers. The grayscale values of the corresponding pixels of each liquid crystal screen layer determine the transmission rates of light intensity. With reference to FIG. 8, $\alpha_1$ and $\alpha_2$ are pixel positions of the liquid crystal screen layer A 13, and $\beta_1$ is a pixel position of the liquid crystal screen layer B 14. Assuming that two beams of light pass through the liquid crystal screen layer A 13 and the liquid crystal screen layer B 14, the output light intensities of the two beams of light can be expressed as:

$$I_{out}(\alpha_1,\beta_1)=I_{in}\times T_A(\alpha_1)\times T_B(\beta_1), \text{ and}$$

$$I_{out}(\alpha_2,\beta_1)=I_{in}\times T_A(\alpha_2)\times T_B(\beta_1),$$

where $T_A(\alpha_1)$ and $T_A(\alpha_2)$ represent the transmission rates of light intensity at the positions $\alpha_1$ and $\alpha_2$ of the liquid crystal screen layer A 13, respectively, and similarly, $T_B(\beta_1)$ represents the transmission rate of light intensity at the position $\beta 1$, so that the two beams of light have different light intensities. Based on this model, although different beams of light pass through the same pixel of a certain liquid crystal screen, these beams of light must pass through different pixels of another screen at a certain distance, thereby implementing different light field intensity information. According to this principle, the modulation of the light field can be implemented by controlling the display pixels of different liquid crystal screens.

Corresponding to some embodiments of the present disclosure, the first image 9 and the second image 10 in FIG. 7 can be assumed to be two liquid crystal screens, and the first image 9 and the second image 10 act as the liquid crystal screens in the principle of the squeezed light field. It is equivalent to providing two liquid crystal screens at two fixed positions, and the light passing through the two liquid crystal screens can be mutually modulated. The first liquid crystal screen (the first image 9) displays an image, the second liquid crystal screen (the second image 10) acts as a pixel switch, and the switching and grayscale of each pixel are set by the algorithm of the spatial light modulator, so that the direction of the optical path of each light is obtained, thereby forming a specific light field. If no algorithm is set for the spatial light modulator in the subsequent process, images of two depths of field, that is, a fractured light field, is directly observed by human eyes. If an algorithm is set between the two spatial light modulators, the brightness and grayscale of each pixel are controlled by the spatial light modulators, so that a continuous squeezed light field can be formed. The depth of field of the squeezed light field is a range, not two fixed points, and the depth of field is wider.

In a case where the light passing through two liquid crystal screens (two images) is modulated, the direction of the light is not uniquely determined. A point on a front screen may correspond to two points or more points on a back screen, which is equivalent to multiplexing of a pixel, and the direction of the light is not uniquely determined. In the case where the direction of the light is not uniquely determined, the depth of field of the light field is not deep enough. In a case where the light passes through three liquid crystal screens (three images), a line determined by three points can determine the direction of the light more accurately. After the direction of the light is uniquely determined by the points on each screen, an infinite depth of field can be modulated. In practical applications, because the number of pixels is limited, three screens may not uniquely determine all the directions of the light, either, so that the larger the number of screens (the number of images), the better the modulation effect. Each screen (each image) is correspondingly provided with a spatial light modulator, and a plurality of screens (a plurality of images) need to be provided with a plurality of spatial light modulators. In the process of forming the squeezed light field, the spatial light modulators cooperate with each other, and the reflected modulated light changes continuously, thereby forming a dynamically transforming image.

Figure 9A:
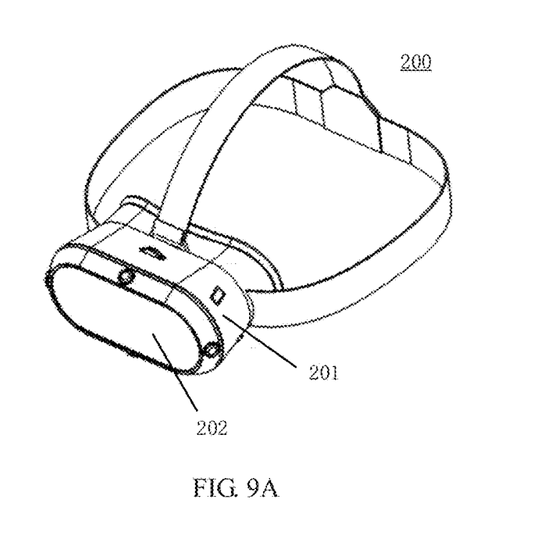
FIG. 9A is a schematic diagram of augmented reality glasses provided by at least an embodiment of the present disclosure.

Some embodiments of the present disclosure further provide augmented reality glasses. With reference to FIG. 9A, the augmented reality glasses 200 include a frame 201 and a lens 202, and the lens 202 is provided with the holographic optical element 1 of any one of the embodiments described above. The holographic optical element 1 described above is light, thin and transparent, can be directly attached to the lens 202, which is simple and convenient to operate; moreover, the holographic optical element 1 can simultaneously modulate images of multiple depths of field. Therefore, when the holographic optical element 1 can present modulated images of multiple depths of field, the ambient light can also enter the human eyes through the holographic optical element 1 at the same time, thereby fusing with images of multiple depths of field, and presenting abundant image information.

Figure 9B:
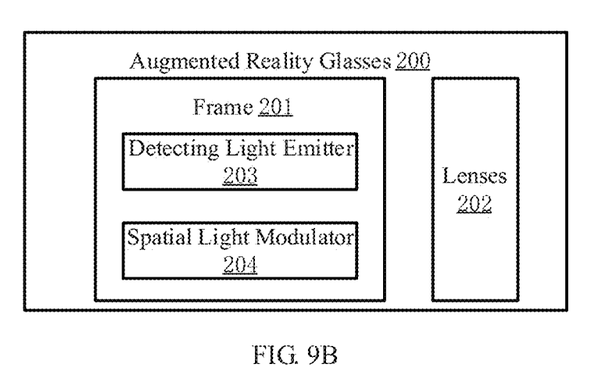
FIG. 9B is a block diagram of augmented reality glasses provided by at least an embodiment of the present disclosure.

In some embodiments, with reference to FIG. 9B, the augmented reality glasses 200 further include a detecting light emitter 203 and a spatial light modulator 204, and the detecting light emitter 203 and the spatial light modulator 204 are disposed on the frame 201 and can be connected through feasible manners such as a snap-fit connection, an adhesive connection or a fixed connection. The positions and angles at which the detecting light emitter 203 and the spatial light modulator 204 are disposed are determined according to the practical direction and angle required for the emitting light thereof.

What have been described above are only specific implementations of the present disclosure, the protection scope of the present disclosure is not limited thereto, and the protection scope of the present disclosure should be based on the protection scope of the claims.

What is claimed is:

1. A holographic optical element, comprising: a substrate and a recording material layer on the substrate, wherein at least two groups of interference fringes are recorded in the recording material layer, and each group of the interference fringes comprises a first interference fringe and a second interference fringe;

the first interference fringe is formed by a first signal light incident from one side of the recording material layer and a first reference light incident from the other side of the recording material layer;

the second interference fringe is formed by a second signal light incident from one side of the recording material layer and a second reference light incident from the other side of the recording material layer, and the second signal light passes through a lens before incidence;

an incident angle of the first signal light is equal to an incident angle of the second reference light; and incident directions of the first signal light corresponding to respective groups of the interference fringes are different, and focal lengths of the lenses, through which the second signal light corresponding to respective groups of the interference fringes passes before incidence, are not equal.

2. The holographic optical element according to claim 1, wherein a material of the recording material layer comprises at least one selected from the group consisting of a photosensitive resin, a silver halide, and a dichromate gelatin.

3. An image reconstruction method for a holographic optical element, applicable to the holographic optical element according to claim 1, wherein the image reconstruction method comprises:
using a detecting light to illuminate each group of the at least two groups of interference fringes of the holographic optical element, respectively, so as to construct images of at least two depths of field, wherein each group of the interference fringes comprises a first interference fringe and a second interference fringe, and using the detecting light to illuminate each group of the interference fringes comprises:
providing a spatial light modulator on one side of the holographic optical element, wherein the spatial light modulator is on an extension line of an optical path of the first signal light forming the first interference fringe of the holographic optical element;
using the detecting light to illuminate the first interference fringe along an incident direction of the first reference light to allow the detecting light to be diffracted to the spatial light modulator by the first interference fringe, wherein the detecting light and the spatial light modulator are on the same side of the holographic optical element; and
using the spatial light modulator to modulate a diffracted light of the detecting light, allowing a modulated light to return to the holographic optical element along an incident direction of the second reference light forming the second interference fringe of the holographic optical element, and allowing the modulated light to be diffracted to an extension line of an optical path of the second signal light forming the second interference fringe by the second interference fringe;
wherein the detecting light is a coherent light of the first signal light, and the modulated light is a coherent light of the second signal light.

4. The image reconstruction method for the holographic optical element according to claim 3, wherein the spatial light modulator comprises an amplitude-type spatial light modulator or a phase-type spatial light modulator.

5. The image reconstruction method for the holographic optical element according to claim 3, further comprising:
using a plurality of spatial light modulators to form a plurality of beams of modulated light, using different beams of modulated light to modulate images of different depths of field, and allowing intensities of the plurality of beams of modulated light to satisfy a relationship of light intensity modulation of a squeezed light field, so as to form a light field augmented reality.

6. Augmented reality glasses, comprising lenses, wherein the lens is provided with the holographic optical element according to claim 1.

7. The augmented reality glasses according to claim 6, further comprising a frame, a detecting light emitter, and a spatial light modulator, wherein the detecting light emitter and the spatial light modulator are on the frame.

8. A manufacturing method of a holographic optical element, comprising:
forming a recording material layer on a substrate, and
forming at least two groups of interference fringes in the recording material layer, wherein each group of the interference fringes comprises a first interference fringe and a second interference fringe, and forming each group of the interference fringes, comprises:
using a first signal light to illuminate the recording material from one side of the substrate and a first reference light to illuminate the recording material layer from the other side of the substrate, and recording the first interference fringe in the recording material layer;
providing a lens on one side of the substrate, using a second signal light to illuminate the recording material from one side of the substrate and a second reference light to illuminate the recording material layer from the other side of the substrate, and recording the second interference fringe in the recording material layer, wherein the second signal light and the lens are on the same side of the substrate;
wherein in forming each group of the interference fringes, an incident angle of the first signal light is equal to an incident angle of the second reference light; and
in forming different groups of the interference fringes, incident directions of the first signal light are different, and focal lengths of the lenses are different.

9. The manufacturing method of the holographic optical element according to claim 8, wherein the incident angle of the second signal light is determined according to a position and a viewing angle of eyes of an observer with respect to the holographic optical element upon the observer observing an image.

10. The manufacturing method of the holographic optical element according to claim 9, wherein the eyes of the observer are facing a center of the holographic optical element, and the incident direction of the second signal light is perpendicular to a plane of the substrate.

11. The manufacturing method of the holographic optical element according to claim 9, wherein a difference between the incident angles of second reference light corresponding to different groups is greater than or equal to 0.5°.

12. The manufacturing method of the holographic optical element according to claim 9, wherein the lens comprises at least one selected from the group consisting of a convex lens, a concave lens, and a Fresnel lens.

13. The manufacturing method of the holographic optical element according to claim 9, wherein an area of the lens is equal to or greater than an area of the substrate.

14. The manufacturing method of the holographic optical element according to claim 9, wherein the lens is adjacent to the substrate, and a distance between the lens and the substrate is 0 to 5 cm.

15. The manufacturing method of the holographic optical element according to claim 8, wherein a difference between the incident angles of the second reference light corresponding to different groups is greater than or equal to 0.5°.

16. The manufacturing method of the holographic optical element according to claim 8, wherein the lens comprises at least one selected from the group consisting of a convex lens, a concave lens, and a Fresnel lens.

17. The manufacturing method of the holographic optical element according to claim 8, wherein an area of the lens is equal to or greater than an area of the substrate.

18. The manufacturing method of the holographic optical element according to claim 8, wherein the lens is adjacent to the substrate, and a distance between the lens and the substrate is 0 to 5 cm.

19. The manufacturing method of the holographic optical element according to claim 8, wherein a material of the recording material layer comprises at least one selected from the group consisting of a photosensitive resin, a silver halide, and a dichromate gelatin.

* * * * *